United States Patent
Bobzin et al.

(10) Patent No.: US 9,870,474 B2
(45) Date of Patent: Jan. 16, 2018

(54) DETECTION OF SECURE VARIABLE ALTERATION IN A COMPUTING DEVICE EQUIPPED WITH UNIFIED EXTENSIBLE FIRMWARE INTERFACE (UEFI)-COMPLIANT FIRMWARE

(71) Applicant: Insyde Software Corp., Taipei (TW)

(72) Inventors: Jeffery Jay Bobzin, Harvard, MA (US); Martin O. Nicholes, Rocklin, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/245,628

(22) Filed: Apr. 4, 2014

(65) Prior Publication Data

US 2014/0304520 A1 Oct. 9, 2014

Related U.S. Application Data

(60) Provisional application No. 61/809,787, filed on Apr. 8, 2013.

(51) Int. Cl.
*G06F 21/57* (2013.01)

(52) U.S. Cl.
CPC .................................. *G06F 21/572* (2013.01)

(58) Field of Classification Search
CPC ...................................................... G06F 21/572
USPC ........................................................ 713/187
See application file for complete search history.

(56) References Cited

U.S. PATENT DOCUMENTS

| | | | |
|---|---|---|---|
| 7,917,762 B2 | 3/2011 | Lewis et al. | |
| 8,365,297 B1 | 1/2013 | Parshin et al. | |
| 2005/0257073 A1* | 11/2005 | Bade | G06F 21/575 713/193 |
| 2008/0034412 A1* | 2/2008 | Wahl | G06F 21/41 726/8 |
| 2008/0126779 A1 | 5/2008 | Smith | |
| 2008/0184361 A1* | 7/2008 | Thekkath | G06F 21/71 726/17 |
| 2009/0327741 A1 | 12/2009 | Zimmer et al. | |
| 2011/0138166 A1 | 6/2011 | Peszek et al. | |
| 2012/0102313 A1* | 4/2012 | Nicolson | G06F 21/575 713/2 |
| 2013/0263205 A1* | 10/2013 | Jacobs | G06F 21/57 726/1 |
| 2014/0189336 A1* | 7/2014 | Ballesteros | G06F 21/575 713/2 |

* cited by examiner

*Primary Examiner* — Benjamin Kaplan
(74) *Attorney, Agent, or Firm* — McCarter & English, LLP; John S. Curran

(57) ABSTRACT

A firmware-based mechanism for protecting against physical attacks on ROM areas holding Authenticated Variables. A first hash of contents of at least one Authenticated Variable is created by a computing device's UEFI-compliant firmware and stored in a non-volatile storage location. Subsequently a second hash of contents of the at least one Authenticated Variable is created by the firmware and compared by the firmware to the stored hash to identify unauthorized modifications of the at least one Authenticated Variable occurring after the creation of the first hash.

20 Claims, 4 Drawing Sheets

DETECTION OF SECURE VARIABLE ALTERATION IN A COMPUTING DEVICE EQUIPPED WITH UNIFIED EXTENSIBLE FIRMWARE INTERFACE (UEFI)-COMPLIANT FIRMWARE

RELATED APPLICATION

This application claims the benefit of U.S. Provisional Patent Application No. 61/809,787, entitled "Detection of Secure Variable Alteration in a Unified Extensible Firmware Interface (UEFI)-Compliant Computing Device", filed on Apr. 8, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

The UEFI specification provides a facility called driver signature checking by which software from other parties can be 'signed' using public/private key cryptographic techniques at its origin. This signature is validated by the computing device firmware prior to allowing this software to operate. The signature checking concentrates on software added to configure optional components (plug-in boards) and software supplied by the operating system for early boot steps (OS boot loaders). The signature checking is accomplished with a library of approved keys. The computing device must take care to not allow unauthorized software elements any ability to modify the library of approved keys as this would allow rogue software elements to defeat the signature checking.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

The computing device contains one or more elements known as Central Processing Units (CPU) which, when in operation, can read from and also erase and/or write flash ROM. The CPU has a normal operating mode and a second operating mode called System Management Mode (SMM). When the CPU is in normal operating mode it can access all elements of the computer except certain memory regions exclusively dedicated to SMM mode. In contrast, when the CPU is operating in SMM mode it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by firmware. The exact triggers available differ somewhat from among system designs but the result when the platform appropriate trigger is used is always that execution in main memory is immediately suspended and execution begins at a specific location in SMM memory.

BRIEF SUMMARY

Embodiments of the present invention provide a firmware-based mechanism for protecting against physical attacks on ROM areas holding Authenticated Variables in computing devices equipped with UEFI-compliant firmware. A first hash of contents of at least one authenticated variable is created and stored in a non-volatile storage location. Subsequently a second hash of contents of the at least one Authenticated Variable is created and compared to the stored hash to identify unauthorized modifications of the at least one Authenticated Variable occurring after the creation of the first hash.

In one embodiment, a computer-implemented method for detecting secure variable alteration in a computing device equipped with UEFI-compliant firmware creates with the firmware a first hash of the contents of at least one Authenticated Variable in the computing device. The method also stores the first hash in a non-volatile storage location. Subsequently, to the creation of the first hash, a second hash of the contents of the at least one Authenticated Variable is created by the firmware. Unauthorized modifications of the at least one Authenticated Variable occurring after the creation of the first hash are identified by the firmware comparing the first and second hash and detecting a difference.

In another embodiment, a computing device equipped with Unified Extensible Firmware Interface (UEFI)-compliant firmware includes a processor and a Read Only Memory (ROM) holding the firmware code. The execution of the firmware code creates a first hash of contents of at least one Authenticated Variable in the computing device and stores the first hash in a non-volatile storage location. The execution of the firmware code also creates a second hash of the contents of the at least one Authenticated Variable subsequent to the creation of the first hash. Unauthorized modifications of the at least one Authenticated Variable occurring after the creation of the first hash are identified by the firmware comparing the first and second hash and detecting a difference.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

In a computing device equipped with UEFI-compliant firmware any unauthorized changes to critical areas of flash ROM storage such as those areas holding Authenticated Variables must be detected. The Authenticated Variables in a computing device equipped with UEFI-compliant firmware are ordinarily protected from software modification except by authorized agents holding an update signing key. Unfortunately physical attacks in which a flash programmer or other device is used to make a direct physical connection to the computing device in order to modify critical areas in the flash ROM part are still possible. Other forms of attacks are also possible. Embodiments of the present invention address this and other issues by providing a firmware-based mechanism that identifies when such physical attacks on ROM areas holding Authenticated Variables have taken place and alerts the user to any compromised Authenticated Variable.

Figure 1:
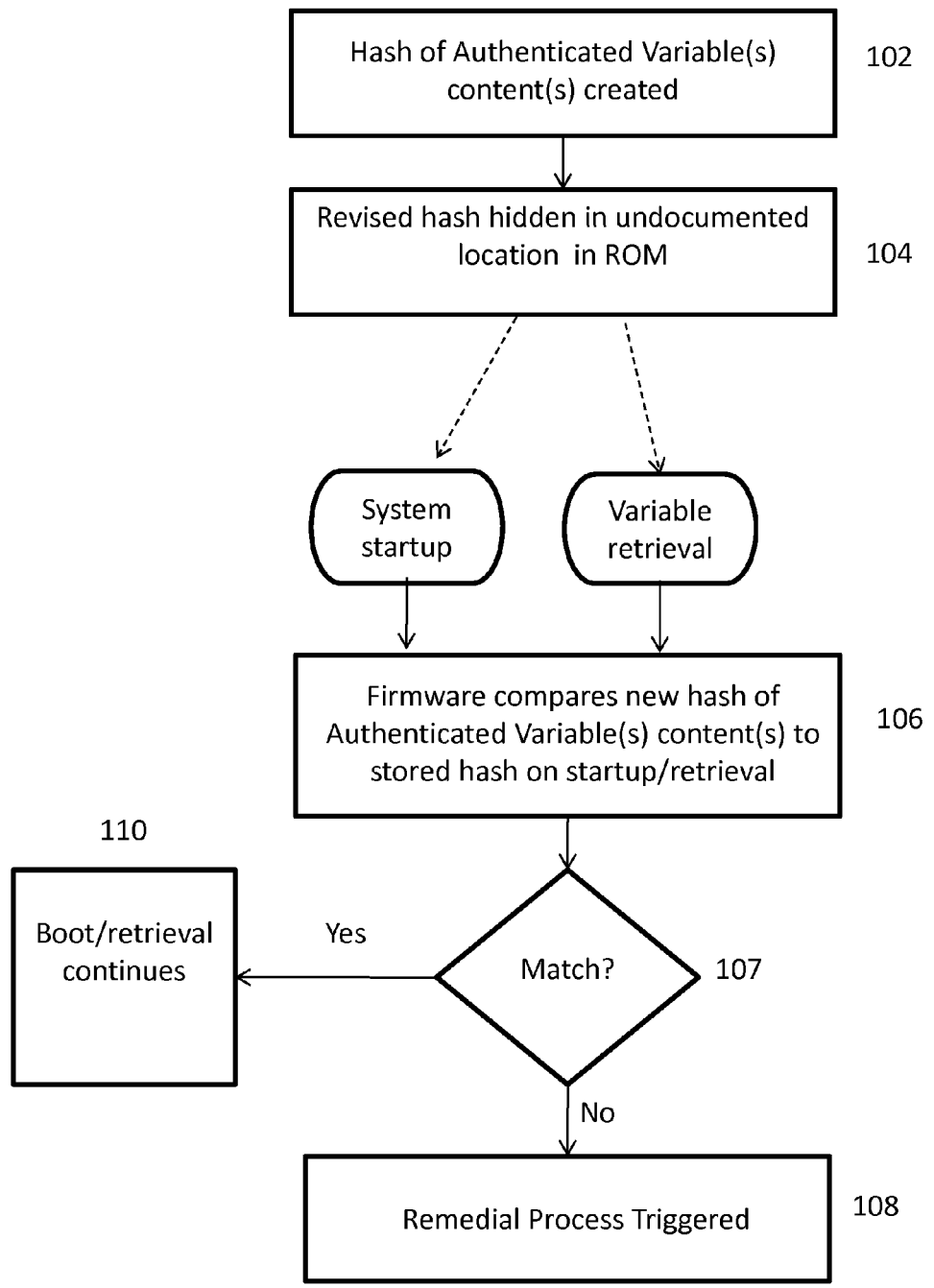
FIG. 1 depicts an exemplary sequence of steps performed by an embodiment of the present invention to detect unauthorized alterations to Authenticated Variables in a computing device equipped with UEFI-compliant firmware.

Embodiments of the present invention utilize a stored hash of the contents of one or more Authenticated Variables to detect any later occurring unauthorized changes to those contents. Embodiments may detect unauthorized changes in each variable separately, groups of Authenticated Variables, or may detect unauthorized changes to the Authenticated Variable region as a whole. As a result, physical or other attacks that replace an Authenticated Variable image and attempt to spoof/copy the Authenticated Variable may be detected and hopefully deterred. FIG. 1 depicts an exemplary sequence of steps performed by an embodiment of the present invention to detect unauthorized alterations to Authenticated Variables in a computing device equipped with UEFI-compliant firmware. The sequence begins with the computing device's firmware creating a cryptographic first hash of the contents of one or more Authenticated Variables (step 102). In most common UEFI implementations the standard and authenticated variables are lumped together (intermixed) in a single variable region. This allows smaller overhead as the variables can share the same file system structure and access methods. The checking of authentication requirements occurs on the way into the drivers. Accordingly, an exemplary sequence to retrieve either a specific list of variables in the variable region or all of the variables in the region would be:

1. Initialize hash (seed)
2. For each item in a list of protected variables or all Authenticated Variables in the region
3. Retrieve the variable using GetVariable( )
4. Add contents to hash
5. Loop to 3 if more authenticated variables
6. Save combined hash Once created, this first hash must be protected from unauthorized changes as it will be used to later validate the underlying Authenticated Variable(s) by identifying whether any unauthorized modification of the contents of that(those) Authenticated Variable(s) has taken place. Accordingly, to protect the first hash, the first hash may be stored in a different undocumented location in the ROM not specified in the UEFI specification or in another location that is not publicly known (step 104). Additionally, random salt (random data used as additional input data) may be added to the one-way hash function creating the hash. This stored first hash of the contents of the Authenticated Variable(s) must also be updated with every new creation or authorized modification of the Authenticated Variable or region to which the first hash applies.

On a subsequent boot, or when the Authenticated Variable(s) (for which the first hash was previously created and stored) is/are next accessed, the Authenticated Variable contents are again hashed to determine if any unauthorized changes have occurred to the Authenticated Variable(s) (step 106). The new hash and the previously stored first hash are compared by the device's firmware (step 107). If the new hash and the previously stored hash do not match when compared by the firmware, the firmware determines that an unauthorized change has occurred and a remedial action as determined by system policy such as interrupting the boot sequence and/or Authenticated Variable access attempt is performed (step 108). The interruption may lock the hard drive, log a message, display a message and/or take other remedial actions as directed by system policy. If the new hash and the stored hash do match (i.e. are identical), the boot sequence and/or Authenticated Variable retrieval continues as normal (step 110). It will be appreciated that each of the Authenticated Variables may be separately hashed so that any unauthorized change to a specific Authenticated Variable may be detected upon a subsequent attempted access of that individual Authenticated Variable. However, other implementations in which a subset of less than all but more than one of the selected Authenticated Variables are hashed are also within the scope of the present invention as are implementations in which the contents of all of Authenticated Variables are hashed as a group to determine whether any change to any content within the group of Authenticated Variables has occurred.

Figure 2:
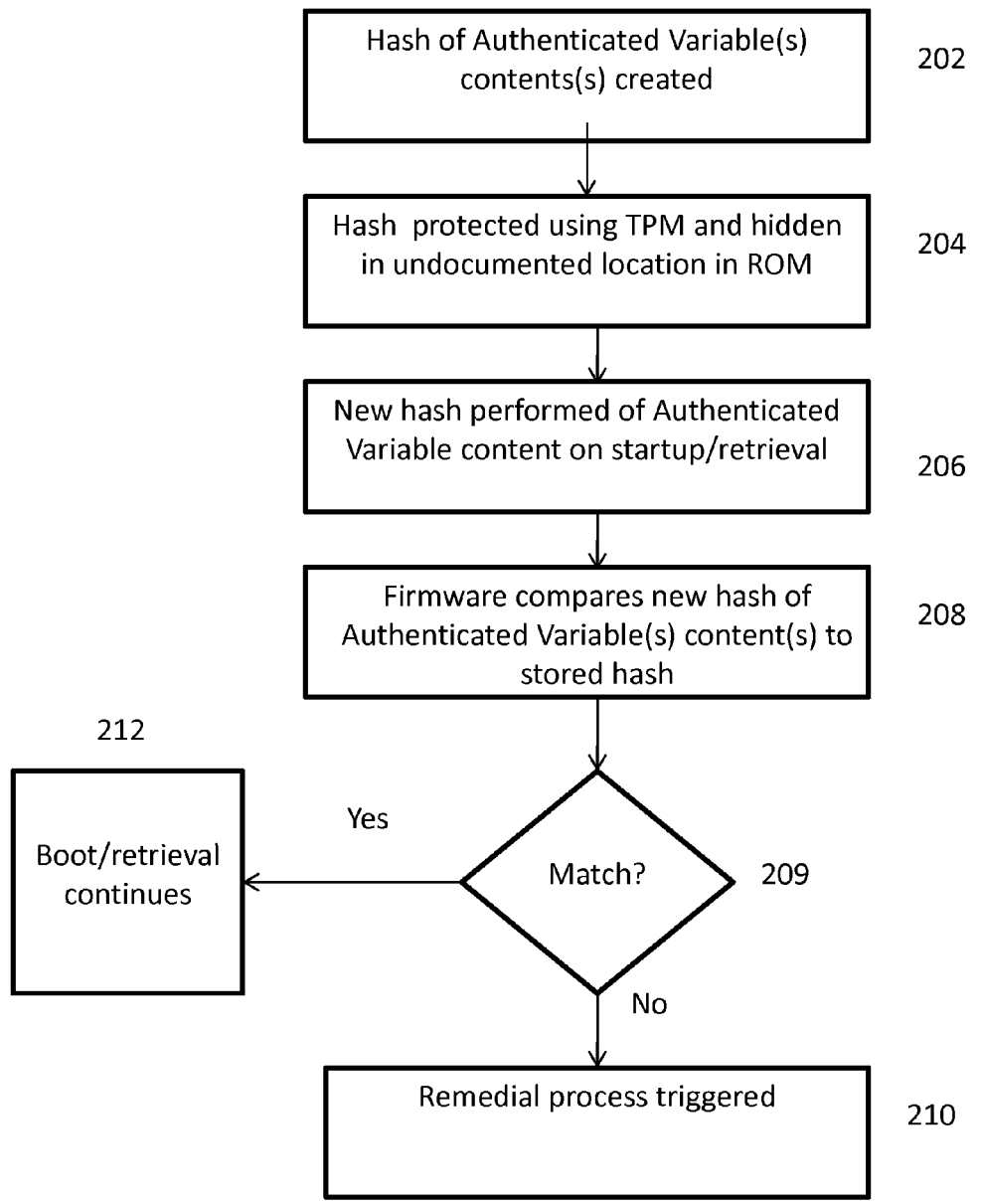
FIG. 2 depicts an exemplary sequence of steps performed by an embodiment of the present invention using a Trusted Platform Module (TPM) to detect unauthorized alterations to Authenticated Variables in a computing device equipped with UEFI-compliant firmware.

In another embodiment, a Trusted Platform Module (TPM) may be used to further protect the first hash of the Authenticated Variable(s). A TPM is a secure cryptoprocessor complying with the Trusted Computing Group Trusted Platform Module specification that can generate and store cryptographic keys that protect information. FIG. 2 depicts an exemplary sequence of steps performed by an embodiment of the present invention using a TPM to detect unauthorized alterations to the contents of one or more Authenticated Variables in a computing device equipped with UEFI-compliant firmware. The sequence begins with the computing device's firmware creating, after each Authenticated Variable creation or update, a first cryptographic hash of the contents of a list of Authenticated Variables chosen for protection, or, in another embodiment, a hash of all Authenticated Variables found to exist (step 202). It will be appreciated that the first hash may be based on the contents of less than all of the Authenticated Variables in the region. The hash measurement may be protected using a TPM and the result stored in the flash ROM part (step 204). In one exemplary embodiment, the TPM may be compliant with version 1.2 or later of the TPM specification. The protection of the hash using the TPM may be done by sealing the hash using current Platform Configuration Register (PCR) settings, or the hash may be signed using a key that only works on the system's TPM. For example, the PCR settings may be measurements from the boot loader, BIOS, UEFI Drivers, System Settings, and master boot records stored in the PCR. The configuration measurements can be used to "seal" the hash value or the hash may be signed with a key and the key is sealed with the PCR settings. In such a case, the hash (or key) could only be unsealed and used if the PCR confirms that the computing device is in the same state as when the hash or key was initially sealed. Similarly to the embodiment discussed with respect to FIG. 1, the first hash may be stored in an undocumented ROM location not specified in the UEFI specification or elsewhere.

When the computing system is powered on again, or when the variables are retrieved, the device firmware creates a new cryptographic hash of the protected Authenticated Variable contents (step 206). Device firmware may then use the TPM to recover the protected hash value by unsealing the hash or key. Once the original hash measurement is retrieved, the device firmware compares the hash values (step 208). If the hashes are not identical (step 209), an unauthorized flash modification has been detected and the Authenticated Variable contents are no longer trusted. As a result, a remedial action as determined by system policy such as halting the boot sequence or retrieval process is performed (step 210). Similarly, if the protected hash value is not able to be recovered, then the computing device's firmware may likewise be configured to conclude that an unauthorized flash modification has been detected and halt the boot sequence or retrieval process. On the other hand, if the comparison of the hashes match (step 209), the boot sequence or Authenticated Variable access and/or retrieval process continues as normal (step 212).

Figure 3:
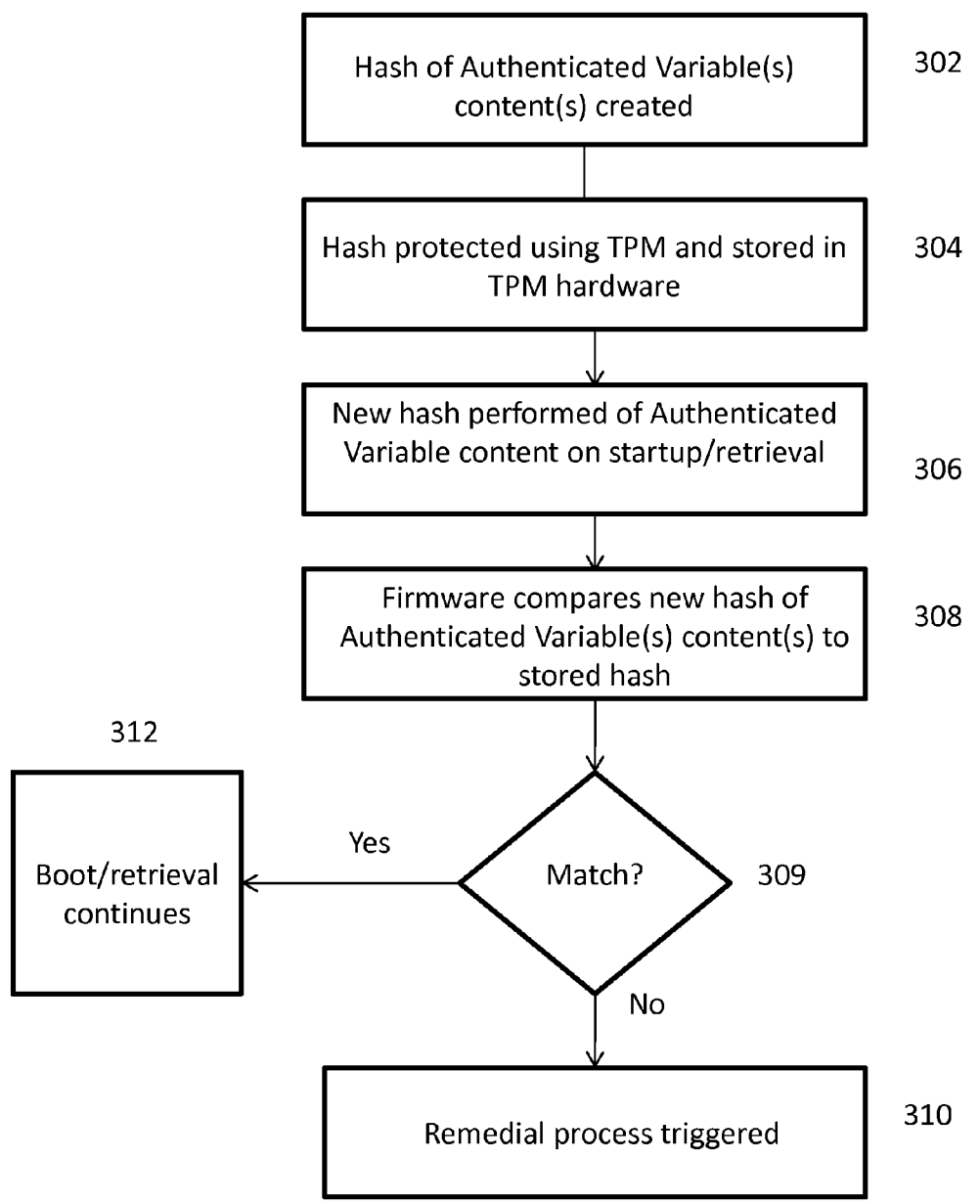
FIG. 3 depicts an exemplary sequence of steps performed by an alternate embodiment of the present invention using a TPM to detect unauthorized alterations to Authenticated Variables in a computing device equipped with UEFI-compliant firmware.

In addition to storing the first hash value in an undocumented location in the ROM, other storage locations are also possible within the scope of the present invention. For example, FIG. 3 depicts an exemplary sequence of steps performed by another embodiment of the present invention using a TPM to detect unauthorized alterations to the contents of one or more Authenticated Variables in a computing device equipped with UEFI-compliant firmware. The storage process is similar to the TPM embodiment described with respect to FIG. 2 except that the calculated hash used for comparison is stored within the TPM hardware itself. In one exemplary embodiment, the TPM may be compliant with version 2.0 of the TPM specification which has more storage for items such as a hash value. The sequence begins with the computing device's firmware creating a cryptographic hash of the contents of the Authenticated Variables after each Authenticated Variable creation or update (step 302). As noted above the cryptographic hash may be based on the contents of less than all of the Authenticated Variables in the variable region. The hash measurement may be protected using a TPM and the result stored in the TPM hardware (step 304). The protection using the TPM may be done by sealing the hash using current PCR settings, or the hash may be signed using a key that only works on the system's TPM. When the system is powered on again, or when the variables are retrieved, the device firmware creates a new cryptographic hash of the protected Authenticated Variable contents (step 306). The computing device's firmware may then use the TPM to recover the protected hash value. Once the original hash measurement is retrieved the firmware compares the hash values (step 308). If the first and second hashes are not identical (step 309), an unauthorized flash modification has been detected and the Authenticated Variable contents are no longer trusted. As a result, a remedial action as determined by system policy such as halting the boot sequence or retrieval process is performed (step 310). Similarly, if the protected hash value is not able to be recovered, then computing device's firmware may be configured to conclude that an unauthorized flash modification has been detected and halt the boot sequence or retrieval process. On the other hand, if the comparison matches (step 309), the boot sequence or retrieval process continues as normal (step 312).

In another embodiment, the computing device's firmware may take a cryptographic hash of critical areas of the flash (such as the Authenticated Variables region) after each authorized creation or update to an authenticated variable. The hash measurement may be created with platform unique salt values, and stored in the flash part. The storage of the hash may be obfuscated to make it difficult to determine locations needed to reassemble the hash. If an attacker modifies the flash part by changing critical areas of the ROM with the system powered off such a modification is detected by the embodiment when the system is powered on again as the firmware takes a new cryptographic hash (including platform unique salt values) of the critical areas. The firmware reassembles the original hash measurement and compares it to the new hash. Any modification of the Authenticated Variables results in non-identical values being detected by the comparison.

It should be appreciated that the stored cryptographic hash may be taken at a number of different times within the scope of the present invention. Similarly, the comparison of hash values may be done on system startup or may be done with each Authenticated Variable request or other times without departing from the scope of the present invention.

Figure 4:
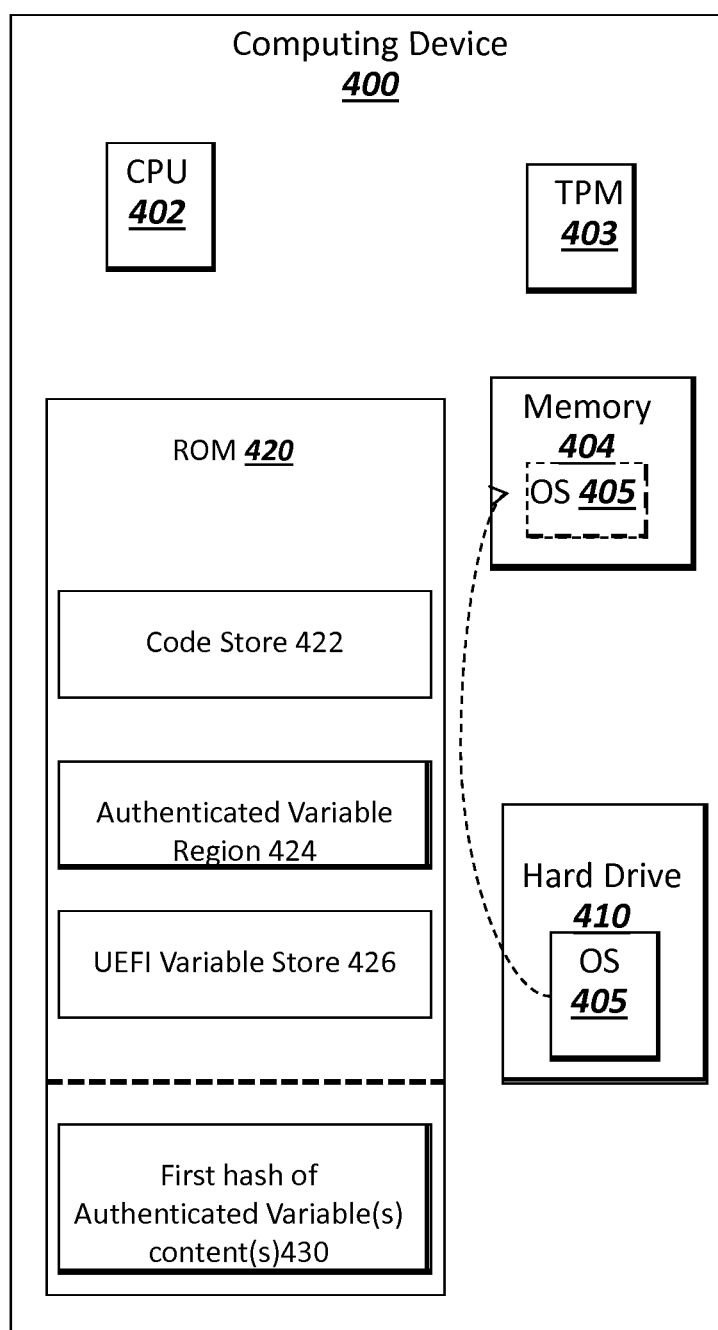
FIG. 4 depicts an exemplary environment suitable for practicing an embodiment of the present invention.

FIG. 4 depicts an exemplary environment suitable for practicing an embodiment of the present invention. A computing device 400 equipped with UEFI-compliant firmware includes a CPU 402 able to operate in normal mode and SMM mode. Access to protected parts of the flash at runtime may be performed using SMM mode, which has better security properties than normal processor mode. The computing device 400 may be a PC, laptop computer, tablet computing device, server, smartphone or some other type of computing device equipped with a processor and able to comply with the requirements of the UEFI specification. The computing device 400 may also include a memory 404 such as Random Access Memory (RAM). An operating system 405 stored on a hard drive 410 in, or in communication with, computing device 400 may be loaded into memory 404 as part of a boot process performed by the computing device.

The computing device 400 may be TPM-compliant with version 1.2, 2.0 or other version of the TPM specification. The computing device 400 may also include flash or other ROM 420. It will be appreciated that the discussion herein that refers to flash ROM is also applicable to other types of ROM. In some cases the system design may incorporate multiple flash ROM devices. The flash ROM 420 may have different sections and hold code store 422 and an Authenticated Variable region 424 holding Authenticated Variables in a system security database. Authenticated variable region 424 may hold authorized keys used for signature checking as set forth in the UEFI specification. The code store and the Authenticated Variables may only be accessible when the CPU 402 is operating in SMM protected mode and so the hash comparisons described herein may, in one embodiment, only take place while the CPU is operating in SMM. The ROM 420 may also store UEFI variable region 426. A first hash 430 of the contents of one or more Authenticated Variables that is created in the manner set forth above may be stored in an undocumented location in the ROM 420. Alternatively, in an embodiment, the first hash 430 of Authenticated Variable contents may be stored in the TPM hardware 403.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computer-implemented method for detecting secure variable alteration in a computing device equipped with Unified Extensible Firmware Interface (UEFI)-compliant firmware, comprising:
    creating with the firmware a first hash of contents of a plurality of Authenticated Variables stored in an Authenticated Variable region, the Authenticated Variable region located in a Read-Only Memory (ROM) in the computing device;
    storing the first hash in an undocumented location in the computing device;
    updating the first hash in response to an authorized modification of at least one of the plurality of Authenticated Variables stored in the Authenticated Variable region;
    storing the updated first hash in a same or different undocumented location;
    detecting, with the firmware, a subsequent boot of the computing device or an attempted access of at least one of the plurality of Authenticated Variables, the detecting occurring subsequent to the storing of the updated first hash;
    creating, with the firmware, based on the detecting, a second hash of the contents of the plurality of Authenticated Variables stored in the Authenticated Variable region;
    identifying with the firmware an unauthorized modification of at least one of the plurality of Authenticated Variables occurring after the creation of the updated first hash by comparing the updated first hash and the second hash and detecting a difference between the updated first hash and the second hash; and
    performing a pre-determined remedial action based on the identification of the unauthorized modification.

2. The method of claim 1 wherein at least one of the first hash and the updated first hash is created with random salt.

3. The method of claim 1 wherein at least one of the first hash and the updated first hash is created using a Trusted Platform Module (TPM) and stored in a ROM part in the computing device.

4. The method of claim 1 wherein at least one of the first hash and the updated first hash is created using a TPM and stored in TPM hardware in the computing device.

5. The method of claim 1 wherein the second hash is created on startup of the computing device.

6. The method of claim 1 wherein the second hash is created upon attempted retrieval of at least one of the plurality of Authenticated Variables.

7. The method of claim 1 wherein at least one of the first hash and the updated first hash is protected using TPM and further comprising:
    sealing at least one of the first hash and the updated first hash using current Platform Configuration Register values.

8. The method of claim 1 wherein the first hash is protected using TPM and further comprising:
    signing the first hash using a key only valid in the computing device's TPM.

9. A non-transitory medium holding computer-executable instructions for detecting secure variable alteration in a computing device equipped with Unified Extensible Firmware Interface (UEFI)-compliant firmware, the instructions when executed causing the computing device to:
    create with the firmware a first hash of contents of a plurality of Authenticated Variables stored in an Authenticated Variable region, the Authenticated Variable region located in a Read-Only Memory (ROM) in the computing device;
    store the first hash in an undocumented location in the computing device;
    update the first hash in response to an authorized modification of at least one of the plurality of Authenticated Variables stored in the Authenticated Variable region;

store the updated first hash in a same or different undocumented location;

detect, with the firmware, a subsequent boot of the computing device or an attempted access of at least one of the plurality of Authenticated Variables, the detecting occurring subsequent to the storing of the updated first hash;

create, with the firmware, based on the detecting, a second hash of the contents of the plurality of Authenticated Variables stored in the Authenticated Variable region;

identify with firmware an unauthorized modification of at least one of the plurality of Authenticated Variables occurring after the creation of the updated first hash by comparing the updated first hash and the second hash and detecting a difference between the updated first hash and the second hash; and perform a pre-determined remedial action based on the identification of the unauthorized modification.

10. The medium of claim 9 wherein at least one of the first hash and the updated first hash is created with random salt.

11. The medium of claim 9 wherein at least one of the first hash and the updated first hash is created using a Trusted Platform Module (TPM) and stored in a ROM part in the computing device.

12. The medium of claim 9 wherein at least one of the first hash and the updated first hash is created using a TPM and stored in TPM hardware in the computing device.

13. The medium of claim 9 wherein the second hash is created on startup of the computing device.

14. The medium of claim 9 wherein the second hash is created upon attempted retrieval of at least one of the plurality of Authenticated Variables.

15. The medium of claim 9 wherein at lease one of the first hash and the updated first hash is protected using TPM and the instructions when executed further cause the computing device to:
    seal at least one of the first hash and the updated first hash using current Platform Configuration Register values.

16. The medium of claim 9 wherein at least one of the first hash and the updated first hash is protected using TPM and the instructions when executed further cause the computing device to:
    sign at least one of the first hash and the updated first hash using a key only valid in the computing device's TPM.

17. A computing device equipped with Unified Extensible Firmware Interface (UEFI)-compliant firmware, comprising:
    a processor; and
    a Read Only Memory (ROM) holding firmware code, the firmware code when executed:
        creating a first hash of contents of a plurality of Authenticated Variables stored in an Authenticated Variable region, the Authenticated Variable region located in a Read-Only Memory (ROM) in the computing device;
        storing the first hash in an undocumented location in the computing device;
        update the first hash in response to an authorized modification of at least one of the plurality of Authenticated Variables stored in the Authenticated Variable region;
        store the updated first hash in a same or different undocumented location;
        detecting a subsequent boot of the computing device or an attempted access of at least one of the plurality of Authenticated Variables, the detecting occurring subsequent to the storing of the updated first hash;
        creating, based on the detecting, a second hash of the contents of the plurality of Authenticated Variables stored in the Authenticated Variable region;
        identifying an unauthorized modification of at least one of the plurality of Authenticated Variables occurring after the creation of the updated first hash by comparing the updated first hash and the second hash and detecting a difference between the updated first hash and the second hash; and
        performing a pre-determined remedial action based on the identification of the unauthorized modification.

18. The computing device of claim 17, further comprising:
    a Trusted Platform Module (TPM) used to create at least one of the first hash and the updated first hash.

19. The computing device of claim 18 wherein at least one of the first hash and the updated first hash is stored in a ROM part in the computing device.

20. The computing device of claim 18 wherein at least one of the first hash and the updated first hash is stored in TPM hardware in the computing device.

* * * * *